(12) United States Patent
Blum et al.

(10) Patent No.: US 11,468,195 B1
(45) Date of Patent: *Oct. 11, 2022

(54) MULTIPLE CLOUD AND REGION DATA CLEAN ROOMS

(71) Applicant: Snowflake Inc., Bozeman, MT (US)

(72) Inventors: Rachel Frances Blum, South Orange, NJ (US); Justin Langseth, Kailua, HI (US); Michael Earle Rainey, Pasco, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,722

(22) Filed: Dec. 16, 2021

Related U.S. Application Data

(63) Continuation of application No. 17/463,293, filed on Aug. 31, 2021, now Pat. No. 11,222,141, which is a continuation of application No. 17/334,297, filed on May 28, 2021, now Pat. No. 11,138,340.

(60) Provisional application No. 63/201,489, filed on Apr. 30, 2021.

(51) Int. Cl.
*G06F 21/00* (2013.01)
*G06F 21/62* (2013.01)
*G06F 16/27* (2019.01)
*G06F 16/245* (2019.01)

(52) U.S. Cl.
CPC ........ *G06F 21/6254* (2013.01); *G06F 16/245* (2019.01); *G06F 16/27* (2019.01)

(58) Field of Classification Search
CPC ...... G06F 16/25; G06F 16/254; G06F 16/256; G06F 16/258; G06F 21/6254; G06F 16/245; G06F 16/27
See application file for complete search history.

(56) References Cited

U.S. PATENT DOCUMENTS

| | | |
|---|---|---|
| 11,138,340 B1 | 10/2021 | Blum et al. |
| 2018/0196955 A1 | 7/2018 | Dageville et al. |
| 2018/0276414 A1 | 9/2018 | Beckman et al. |
| 2021/0089552 A1 | 3/2021 | Karl et al. |

OTHER PUBLICATIONS

"U.S. Appl. No. 17/334,297, Notice of Allowance dated Aug. 16, 2021", 16 pgs.
"U.S. Appl. No. 17/463,293, Notice of Allowance dated Nov. 17, 2021", 16 pgs.

*Primary Examiner* — Tri M Tran
(74) *Attorney, Agent, or Firm* — Schwegman Lundberg & Woessner, P.A.

(57) ABSTRACT

Embodiments of the present disclosure may provide a data clean room allowing secure data analysis across multiple accounts and across different regions and cloud providers. The data clean room may also restrict which data may be used in the analysis and may restrict the output. The overlap data may be anonymized to prevent sensitive information from being revealed. A version of a provider account can be created that is similar to a client account, such as in the same cloud type or the same region as the client database account. The client account can share data that is replicated to the provider account to complete client requests using an anonymized data and the cross reference table.

20 Claims, 11 Drawing Sheets

MULTIPLE CLOUD AND REGION DATA CLEAN ROOMS

CROSS-REFERENCE TO RELATED APPLICATIONS

This application is a Continuation of U.S. patent application Ser. No. 17/463,293, filed Aug. 31, 2021, which is a Continuation of U.S. patent application Ser. No. 17/334,297, filed May 28, 2021 and issued on Oct. 5, 2021 as U.S. Pat. No. 11,138,340, which claims priority to U.S. Provisional Patent Application Ser. No. 63/201,489, filed Apr. 30, 2021, the contents of which are incorporated herein by reference in their entireties for all purposes.

TECHNICAL FIELD

The present disclosure generally relates to securely analyzing data using a data clean room across different clouds and regions.

BACKGROUND

Currently, most digital advertising is performed using third-party cookies. Cookies are small pieces of data generated and sent from a web server and stored on the user's computer by the user's web browser that are used to gather data about customers' habits based on their website browsing history. Because of privacy concerns, the use of cookies is being restricted. Companies may want to create target groups for advertising or marketing efforts for specific audience segments. To do so, companies may want to compare their customer information with that of other companies to see if their customer lists overlap for the creation of such target groups. Thus, companies may want to perform data analysis, such as an overlap analysis, of their customers or other data.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, companies may want to perform analysis on their customers, such as overlap analysis. To perform such types of data analyses, companies can use "trusted" third parties, who can access data from each of the companies and perform the data analysis. However, this third-party approach suffers from significant disadvantages (e.g., delay, network overhead, loss of control of customer data to the third party, the analysis is performed by the third party and not the requesting party). Further, it is difficult to query data from different parties where the parties use different virtual cloud providers and additionally may be located in different geographic regions.

Embodiments of the present disclosure may provide a data clean room allowing secure data analysis across multiple accounts, without the use of third parties. Each account may be associated with a different company or party. The data clean room may provide privacy and security using secure functions to safeguard sensitive information. For example, the data clean room may restrict access to data in other accounts. The data clean room may also restrict which data may be used in the analysis and may restrict the output. The data clean room can be implemented between provider and requestor (client) accounts that are in different regions and/or different on different cloud providers. A client account can request a data clean room from a provider account, and the provider account can create a replica of the provider account in the environment as the client account (e.g., same cloud, same region). In some example embodiments, not all data is replicated from the provider primary account to the provider's replica. Instead, the client account creates a table for querying and one or more queries that reference the client's tables for the queries. The tables for querying the queries can be shared to the replica and replicated to the provider account for processing of the queries using anonymized cross referenced data and shared functions for efficient completion of clean room queries across different clouds and regions.

Figure 1:
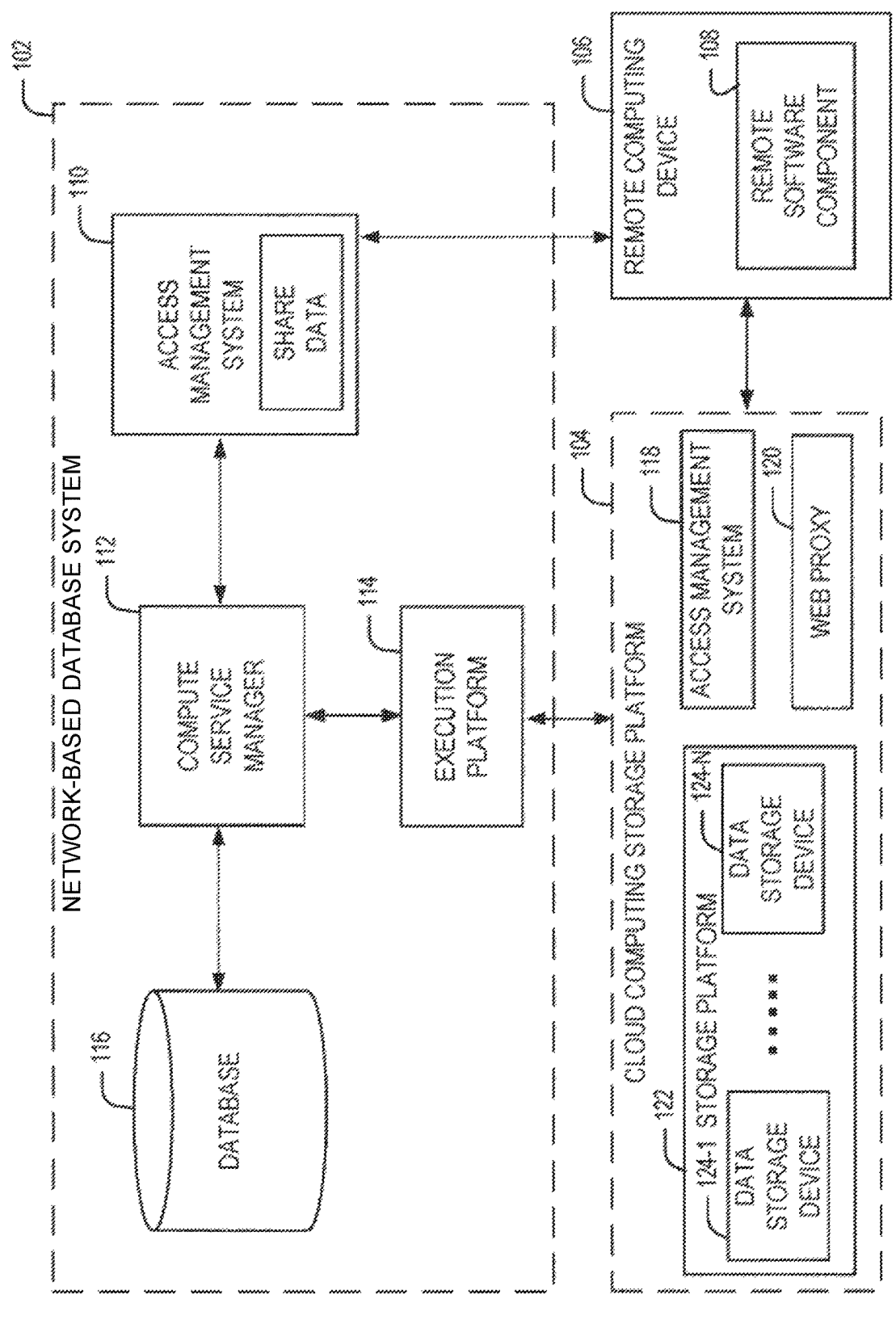
FIG. 1 illustrates an example computing environment in which a network-based database system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a network-based database system is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-$n$ that are part of a cloud computing storage platform 104. In some embodiments, data storage devices 124-1 to 124-$n$ are cloud-based storage devices located in one or more geographic locations. For example, data storage devices 124-1 to 124-$n$ may be part of a public cloud infrastructure or a private cloud infrastructure. Data storage devices 124-1 to 124-$n$ may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (00M) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks.

These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
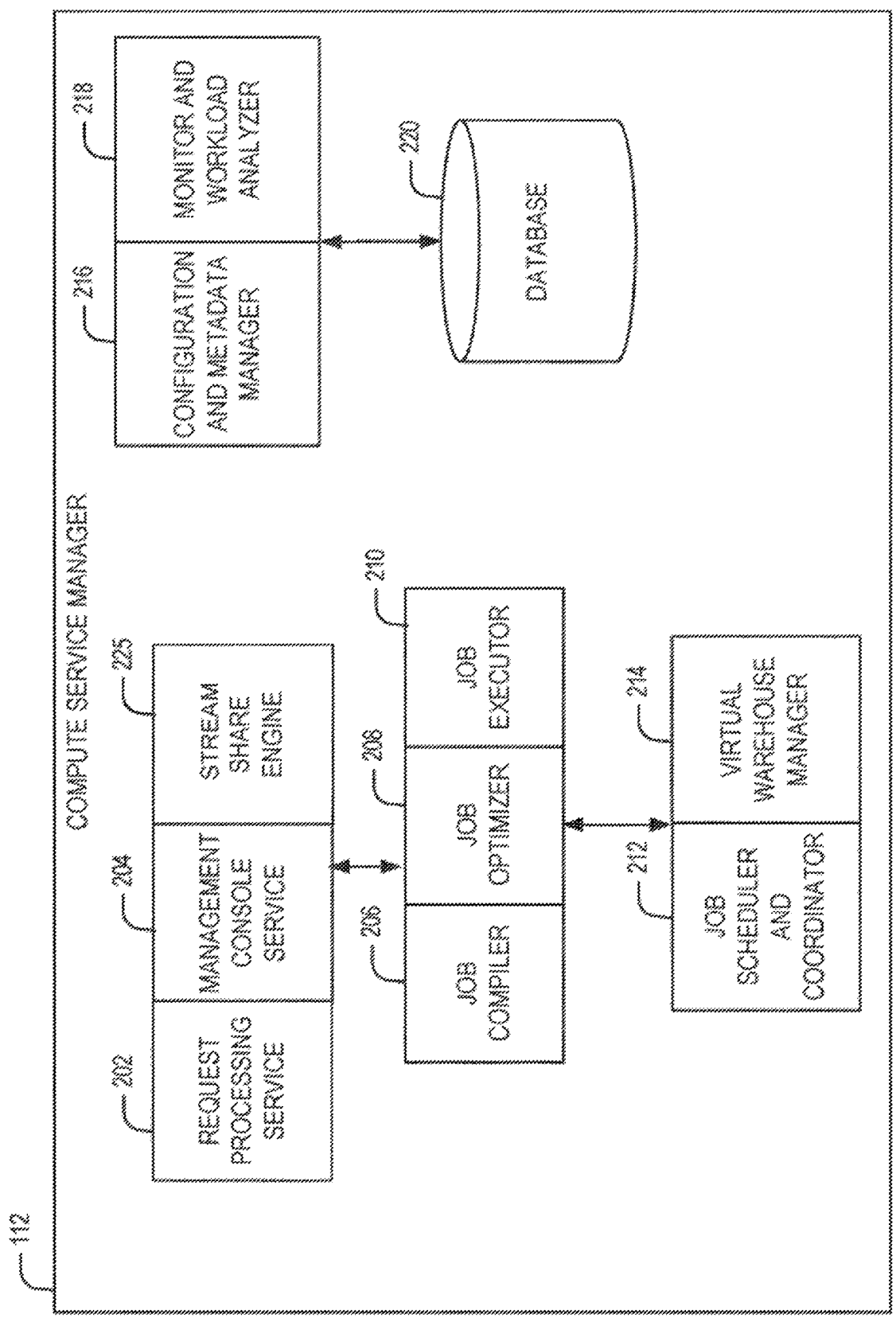
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
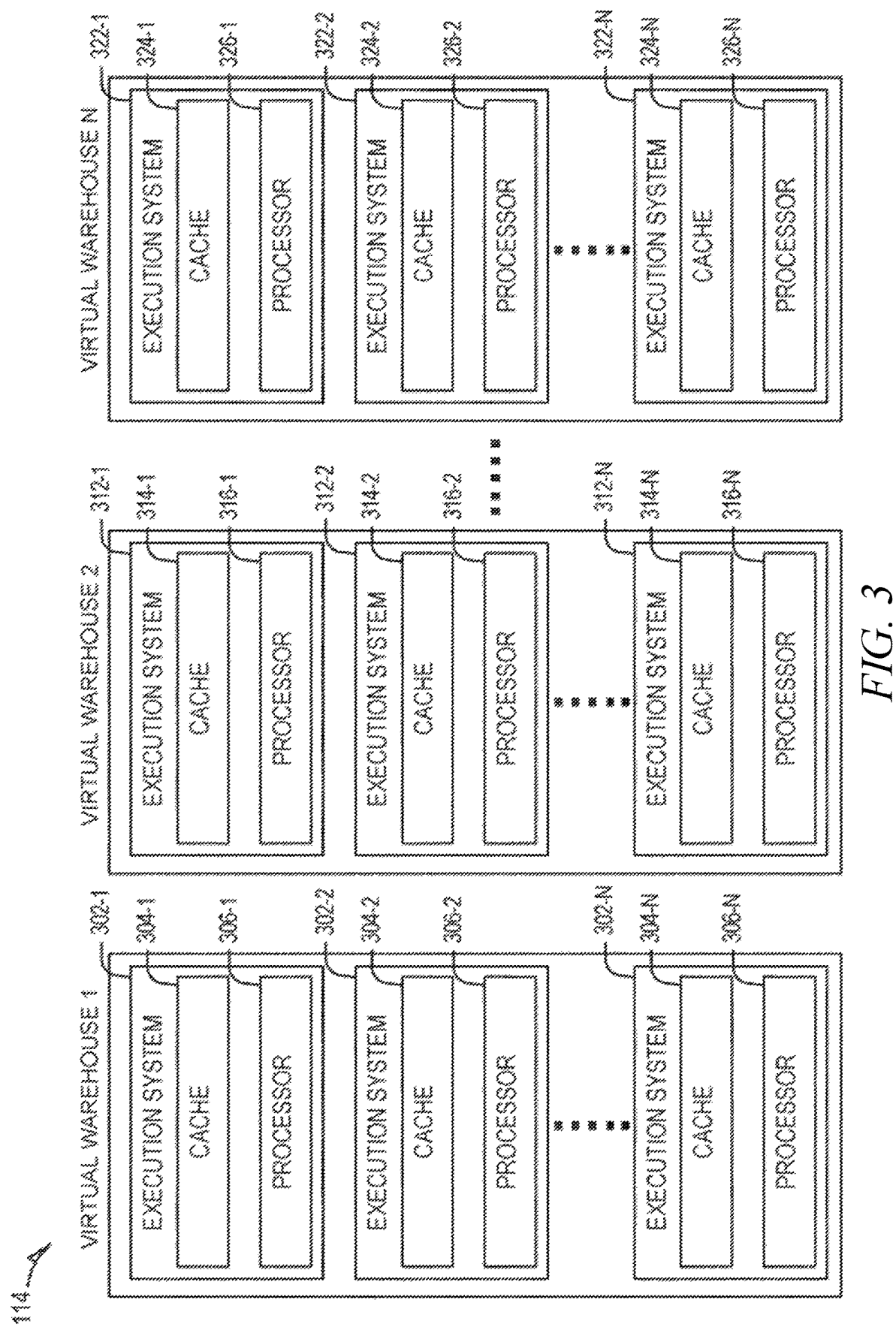
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
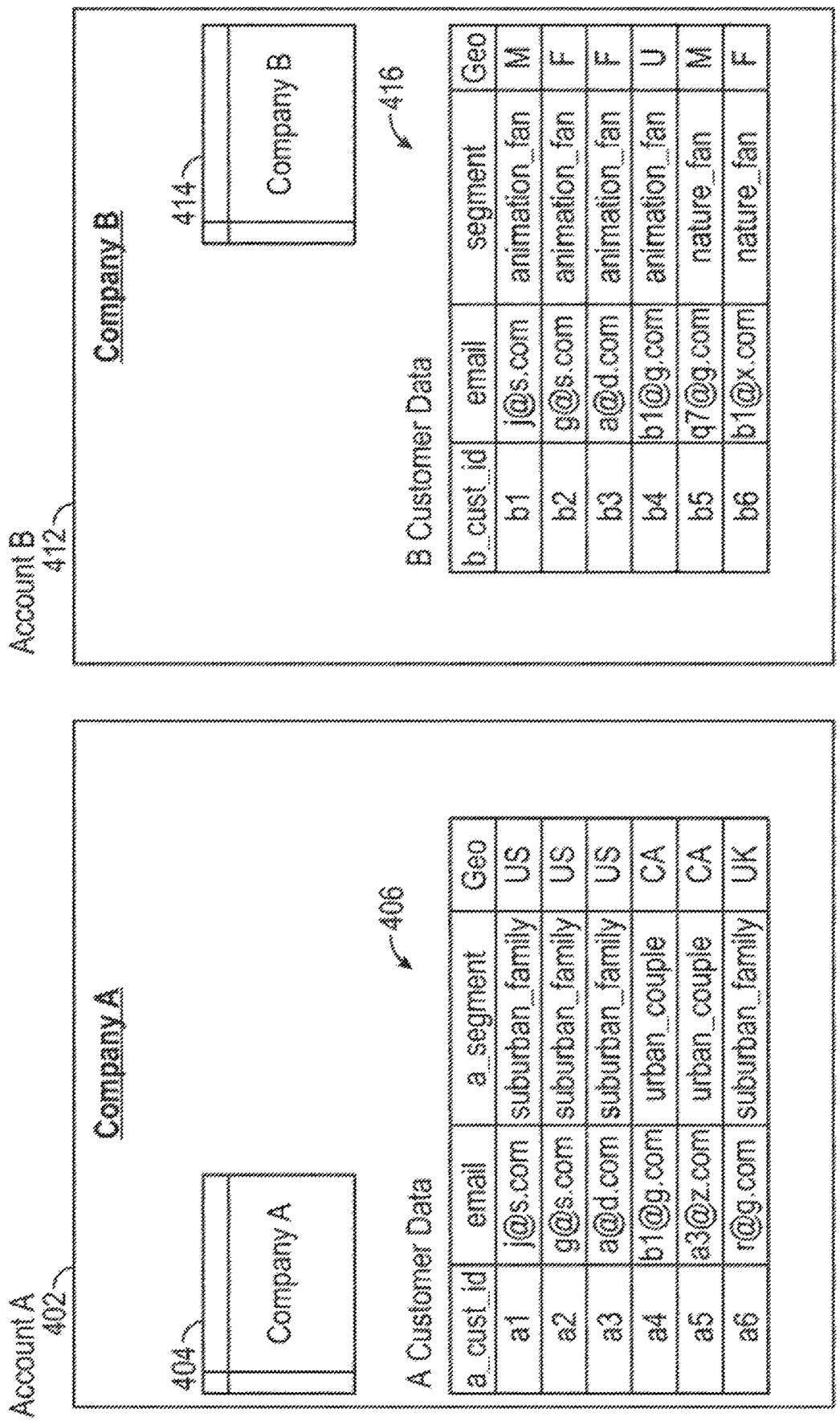
FIG. 4 is a block diagram illustrating accounts in a database system, according to some example embodiments.

FIG. 4 shows an example of two separate accounts in a data warehouse system, according to some example embodiments. Here, Company A may operate an account A 402 with a network-based data warehouse system as described herein. In account A 402, Company A data 404 may be stored. The Company A data 404 may include, for example, customer data 406 relating to customers of Company A. The customer data 406 may be stored in a table or other format storing customer information and other related information. The other related information may include identifying information, such as email, and other known characteristics of the customers, such as gender, geographic location, purchasing habits, and the like. For example, if Company A is a consumer-goods company, purchasing characteristics may be stored, such as whether the customer is single, married, part of a suburban or urban family, etc. If Company A is a streaming service company, information about the watching habits of customers may be stored, such as whether the customer likes sci-fi, nature, reality, action, etc.

Likewise, Company B may operate an account B 412 with the network-based database system as described herein. In account B 412, Company B data 414 may be stored. The Company B data 414 may include, for example, customer data relating to customers of Company B. The customer data 416 may be stored in a table or other format storing customer information and other related information. The other related information may include identifying information, such as email, and other known characteristics of the customers, such as gender, geographic location, purchasing habits, etc., as described above.

For security and privacy reasons, Company A's data may not be accessible to Company B and vice versa. However, Company A and Company B may want to share at least some of their data with each other without revealing sensitive information, such as a customer's personal identity information. For example, Company A and Company B may want to explore cross marketing or advertising opportunities and may want to see how many of their customers overlap and filter based on certain characteristics of the overlapping customers to identify relationships and patterns.

Figure 5:
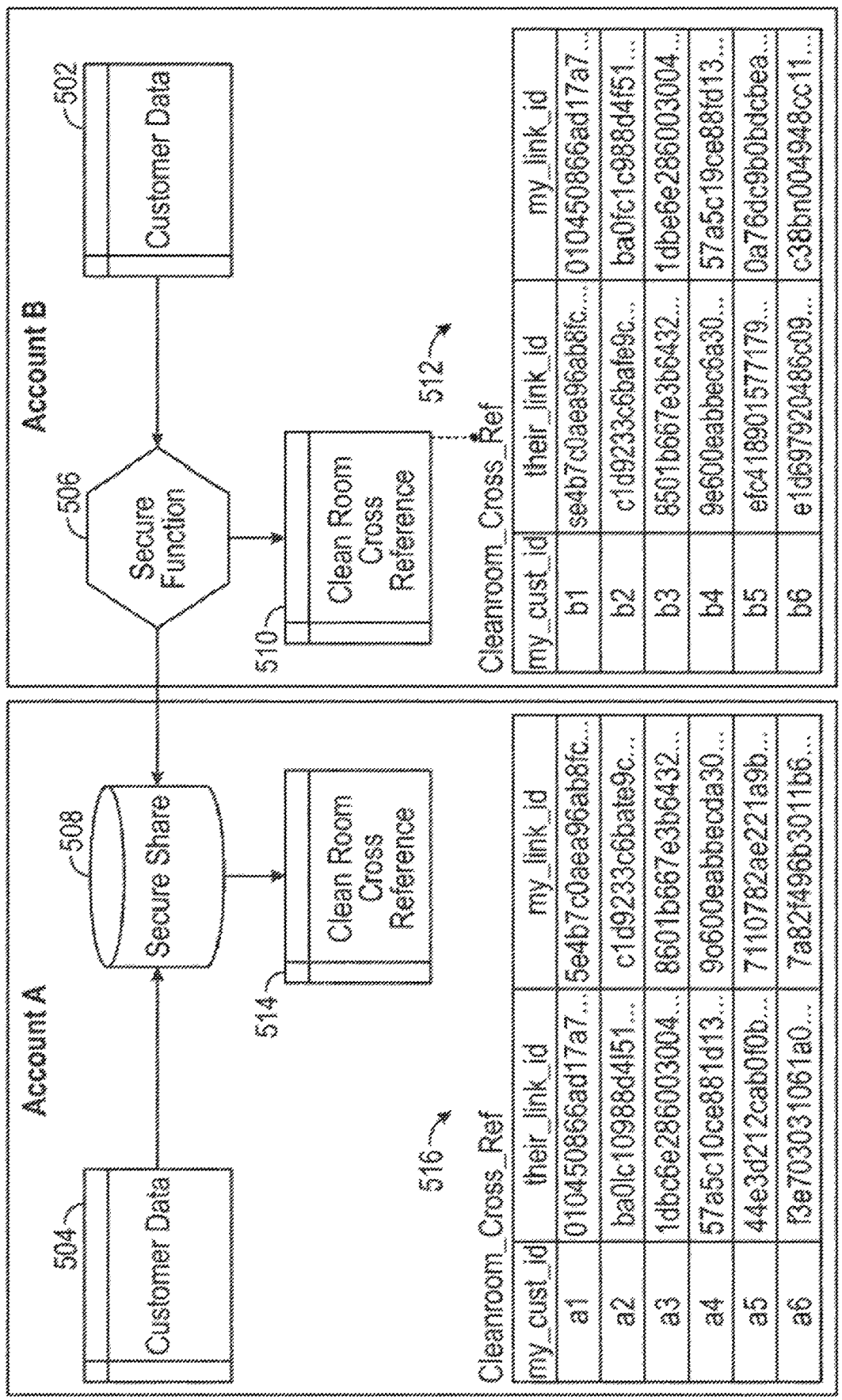
FIG. 5 is a block diagram illustrating a data clean room, according to some example embodiments.

To this end, a data clean room may be provided by the network-based database system as described herein. FIG. 5 is a block diagram illustrating a method for operating a data clean room, according to some example embodiments. The data clean room may enable companies A and B to perform overlap analysis on their company data, without sharing sensitive data and without losing control over the data. The data clean room may create linkages between the data for each account and may include a set of blind cross reference tables.

Next, example operations to create the data clean room are described. Account B may include customer data 502 for Company B, and account A may include customer data 504 for Company A. In this example, account B may initiate the creation of the data clean room; however, either account may initiate creation of the data clean room. Account B may create a secure function 506. The secure function 506 may look up specific identifier information in account B's customer data 502. The secure function 506 may anonymize the information by creating identifiers for each customer data (e.g., generating a first result set). The secure function 506 may be a secure user-defined function (UDF) and may be implemented using the techniques described in U.S. patent application Ser. No. 16/814,875, entitled "System and Method for Global Data Sharing," filed on Mar. 10, 2020, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

The secure function 506 may be implemented as a SQL UDF. The secure function 506 may be defined to protect the underlying data used to process the function. As such, the secure function 506 may restrict direct and indirect exposure of the underlying data.

The secure function 506 may then be shared with account A using a secure share 508. The secure share 508 may allow account A to execute the secure function 506 while restricting account A from having access to the underlying data of account B used by the function and from being able to see the code of the function. The secure share 508 may also restrict account A from accessing the code of the secure function 506. Moreover, the secure share 508 may restrict account A from seeing any logs or other information about account B's use of the secure function 506 or the parameters provided by account B of the secure function 506 when it is called.

Account A may execute the secure function 506 using its customer data 504 (e.g., generating a second result set). The result of the execution of the secure function 506 may be communicated to account B. For instance, a cross reference table 510 may be created in account B, which may include anonymized customer information 512 (e.g., anonymized identification information, private salted by provider's secret salt). Likewise, a cross reference table 514 may be created in account A, which may include anonymized customer information 516 for matching overlapping customers for both companies, and dummy identifiers for non-matching records. The data from the two companies may be securely joined so that neither account may access the underlying data or other identifiable information. For example, the data may be securely joined using the techniques described in U.S. patent application Ser. No. 16/368,339, entitled "Secure Data Joins in a Multiple Tenant Database System," filed on May 28, 2019, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

For instance, cross reference table 510 (and anonymized customer information 512) may include fields: "my_cust_id," which may correspond to the customer ID in account B's data; "my_link_id," which may correspond to an anonymized link to the identified customer information; and a "their_link_id," which may correspond to an anonymized matched customer in company A. "their_link_id" may be anonymized (e.g., salted), so that company B cannot discern the identity of the matched customers. The anonymization may be performed using hashing, encryption, tokenization, or other suitable techniques.

Moreover, to further anonymize the identity, all listed customers of company B in cross reference table 510 (and anonymized customer information 512) may have a unique matched customer from company B listed, irrespective of whether there was an actual match or not. A dummy "their_link_id" may be created for customers not matched. This way neither company may be able to ascertain identity information of the matched customers. Neither company may discern where there is an actual match rather than a dummy returned identifier (no match). Hence, the cross reference tables 510 may include anonymized key-value pairs. A summary report may be created notifying the total number of matches, but other details of the matched customers may not be provided to safeguard the identities of the customers.

Figure 6:
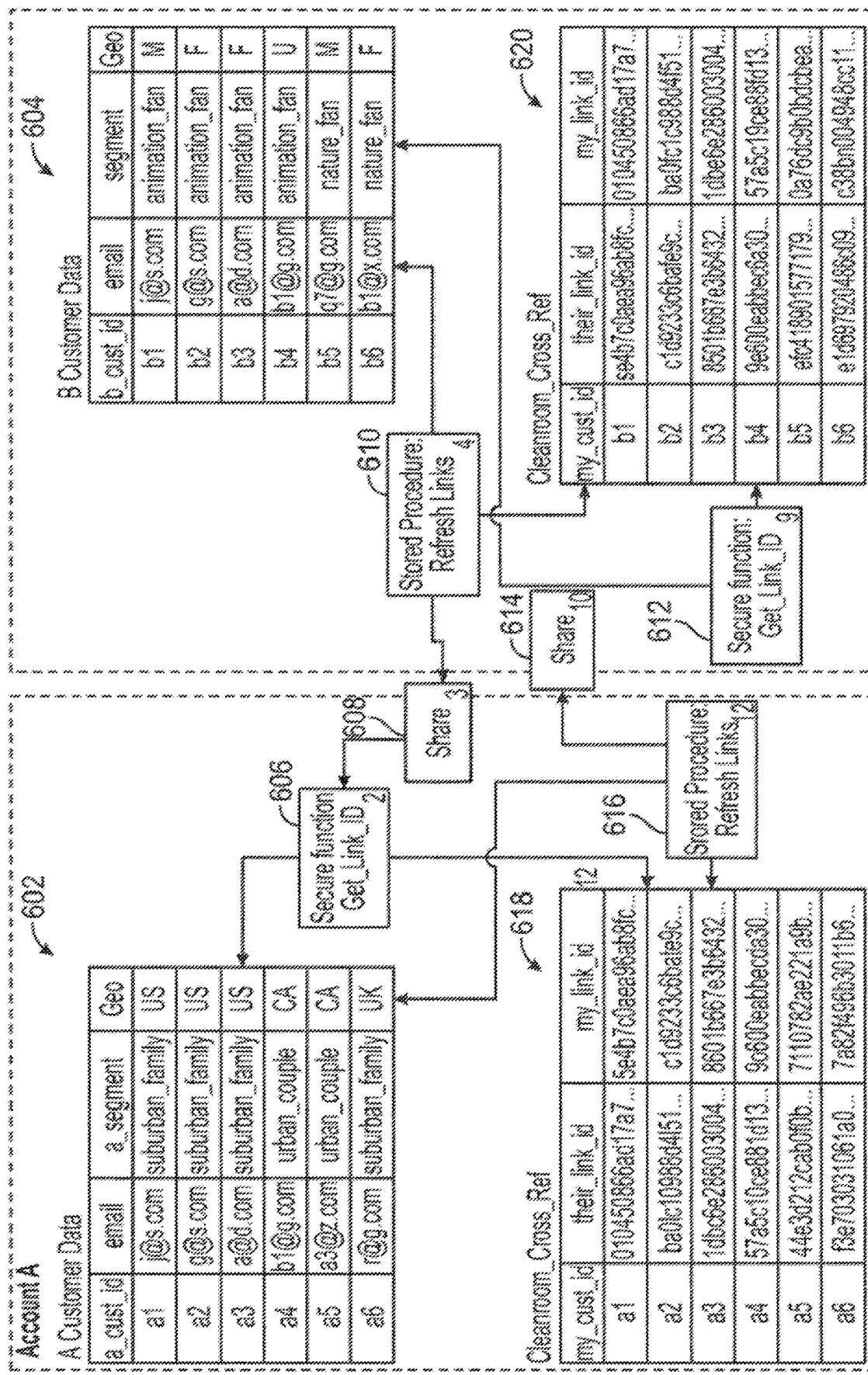
FIG. 6 is a block diagram illustrating a double-blind data clean room, according to some example embodiments.

The data clean room may operate in one or both directions, meaning that a double-blind clean room may be provided. FIG. 6 is a block diagram illustrating a method for operating a double-blind clean room, according to some example embodiments. The double-blind clean room may enable company A to perform overlap analysis using its company data with the company data of Company B and vice versa, without sharing sensitive data and without losing control over their own data. The double-blind clean room may create linkages between the data for each account and may include a set of double-blind cross reference tables.

Here, account A may include its customer data 602, and account B may include its customer data 604. Account A may create a secure function 606 ("Get_Link_ID"), as described above. The secure function 606 may be shared with account B using a secure share 608, as described above. Moreover, a stored-procedures function 610 may detect changes to data in respective customer data and may update and refresh links accordingly.

The same or similar process may be applied from account B to account A with secure function 612, secure share 614, and stored procedures 616. Consequently, the cross reference table 618 in account A may include information about the customer overlap between the two companies. For example, the cross reference table 618 includes fields: "my_cust_id," which may correspond to the customer ID in account A's data; "my_link_id," which may correspond to an anonymized link to the identified customer information of company A; and a "their_link_id," which may correspond to an anonymized matched customer in company B. The anonymization may be performed using hashing, encryption, tokenization, or the like.

Similarly, the cross reference table 620 in account B may include information about the customer overlap between the two companies. For example, the cross reference table 620 includes fields: "my_cust_id," which may correspond to the customer ID in account B's data; "my_link_id," which may correspond to an anonymized link to the identified customer information of company B; and a "their_link_id," which may correspond to an anonymized matched customer in company A. The anonymization may be performed using hashing, encryption, tokenization, or other suitable techniques.

Figure 7A:
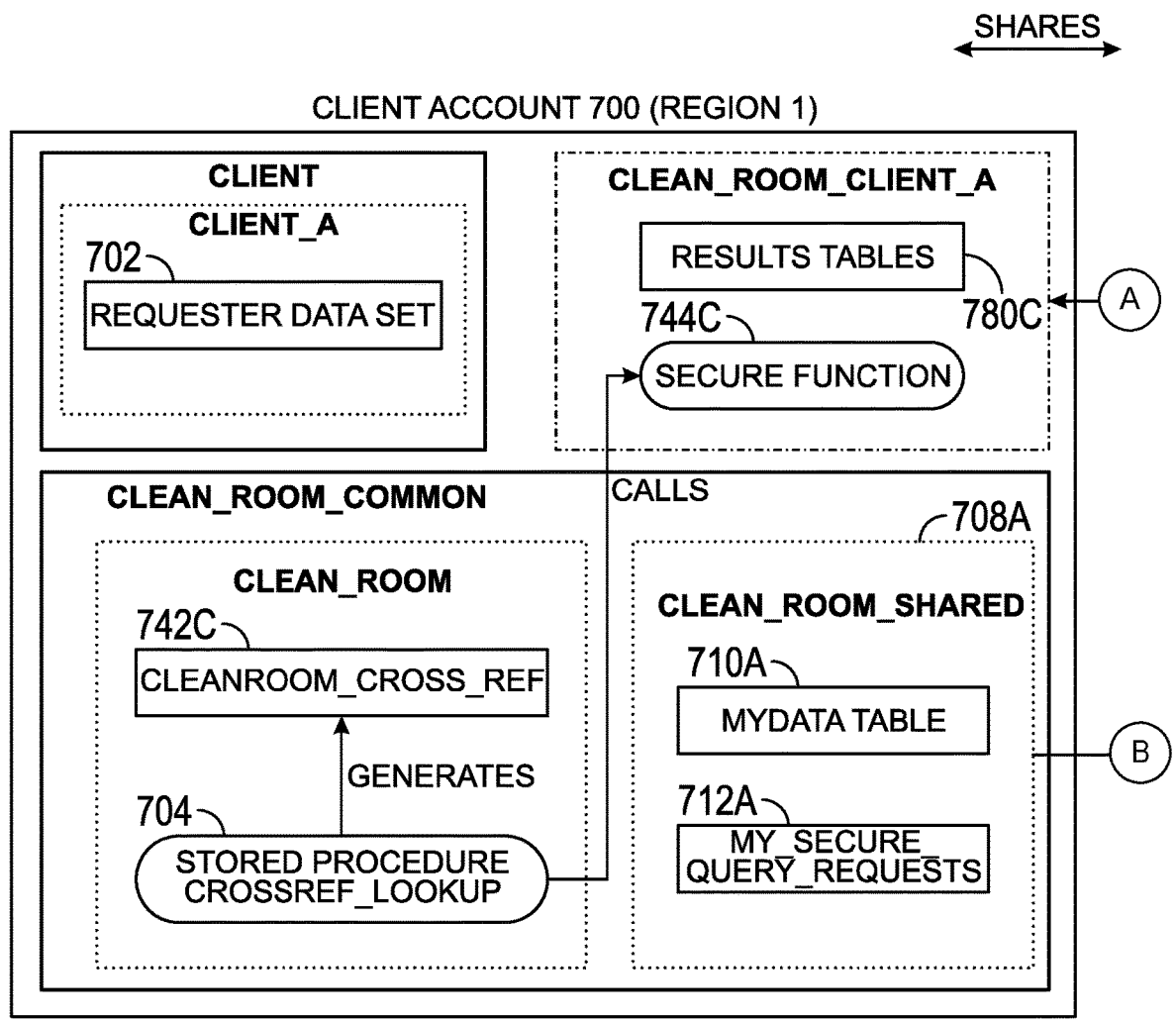
FIGS. 7A-7C show data architectures for implementing a clean room across different clouds and regions, according to some example embodiments.
Figure 7B:
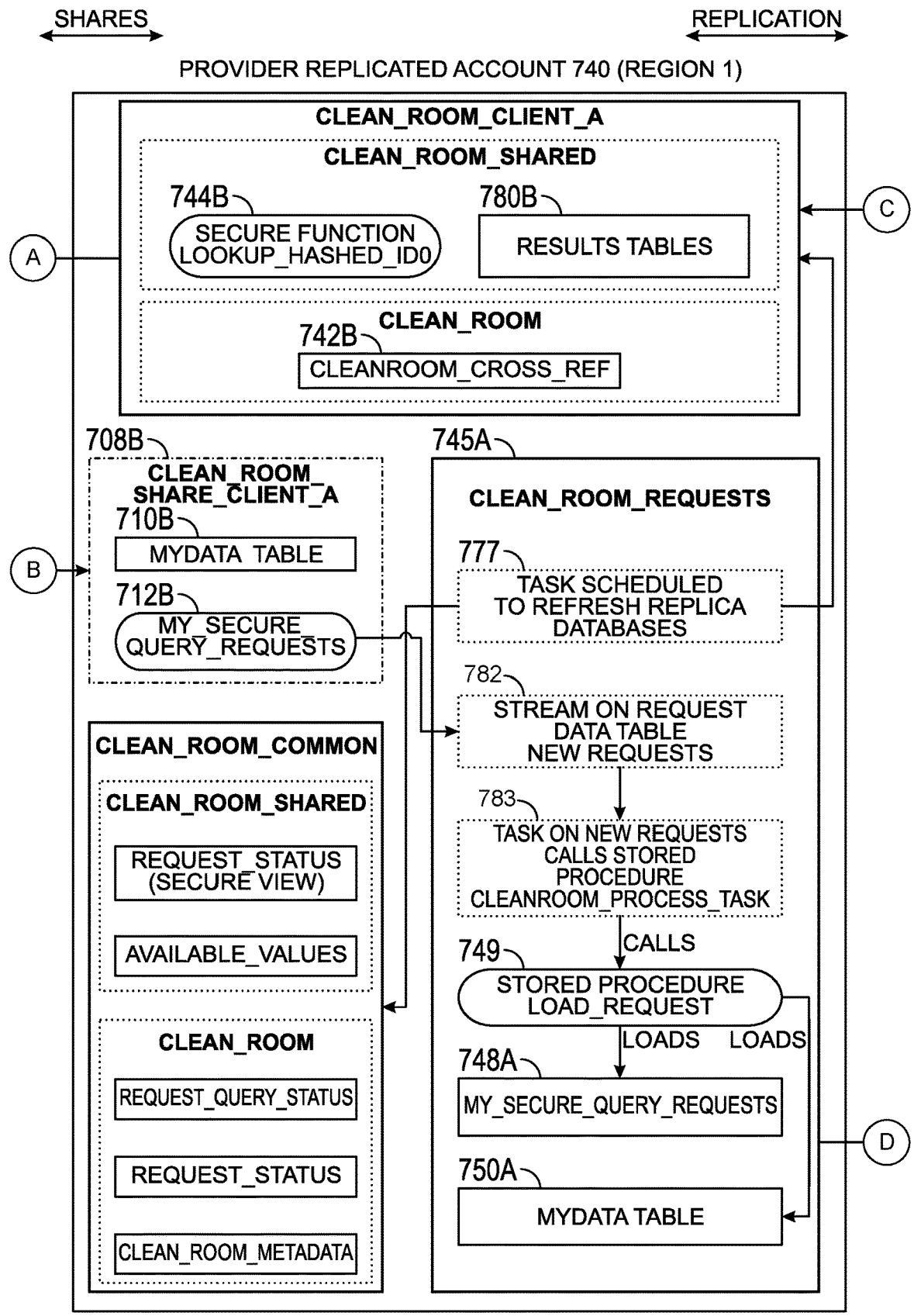
Figure 7C:
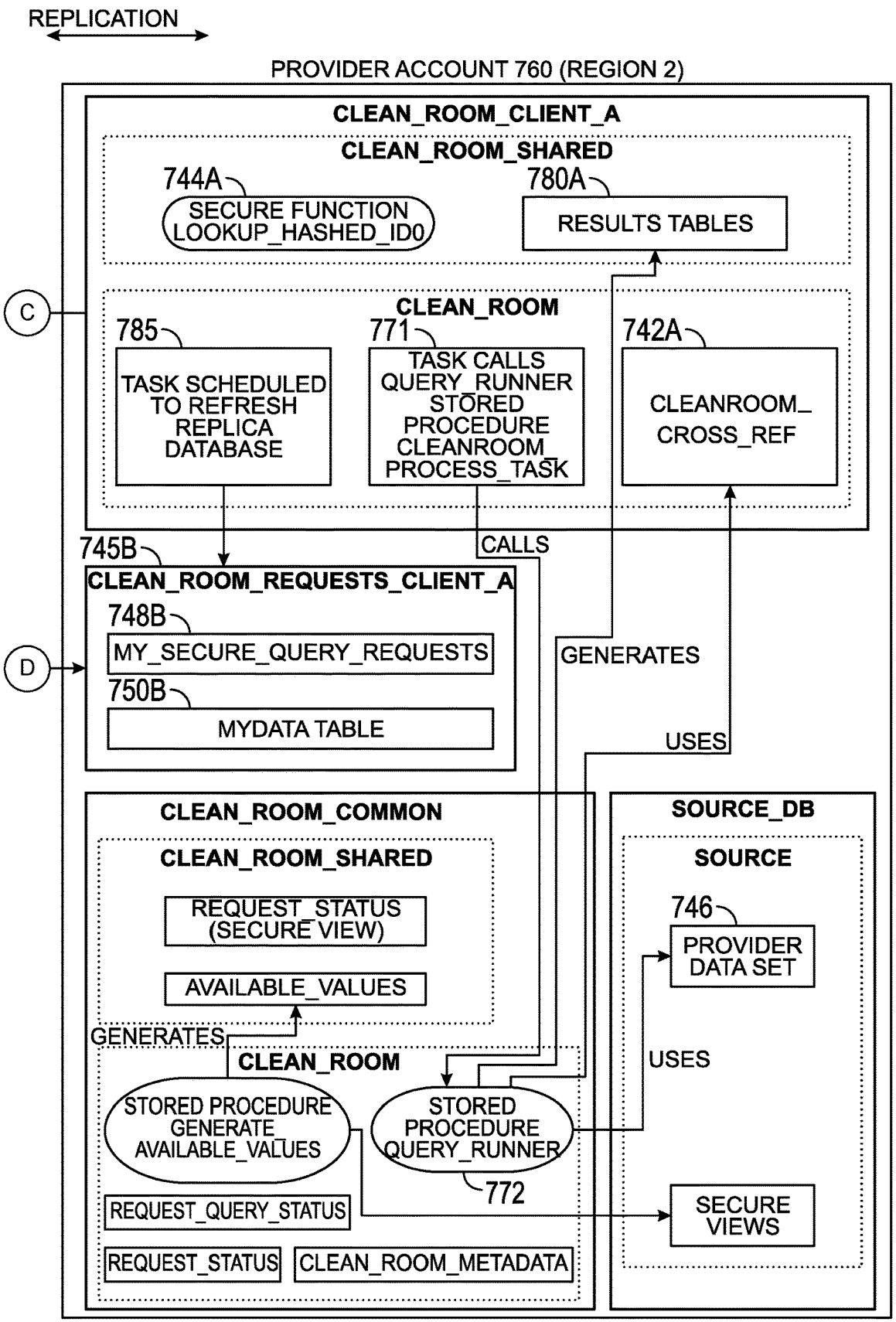

FIG. 7A-7C show an example architecture for implementing data clean rooms across different regions, according to some example embodiments. In particular, FIG. 7A shows a client account 700 that is in a first region (region 1), FIG. 7B shows a provider replica account 740 in the first region (region 1), and FIG. 7C shows a provider account 760 that is in a second region (region 2). Data is exchanged between the different accounts as indicated by the discontinued arrows linking the different figures (arrows A, B, C, and D). In accordance with some example embodiments, the data exchanged between the architecture FIG. 7A and FIG. 7B is performed via data shares (e.g., repointing of metadata within the same cloud) as indicated by the double-headed "shares" arrow at the top of FIGS. 7A and 7B. Further, in accordance with some example embodiments, the data exchanged between the architecture of FIG. 7B and FIG. 7C is performed via data replication (e.g., actual moving of data), as indicated by the double-headed "replication" arrow at the top of FIGS. 7B and 7C.

With reference to FIG. 7C, the provider account 760 receives a request from the client account 700 to perform multi-cloud and/or multi-region clean room queries, where the provider account 760 is in region 2 (e.g., New York City hosted virtual cloud), and the client account 700 is in region 1 (e.g., San Francisco hosted virtual cloud). In response to the request to perform queries using a clean room, the provider account 760 creates a provider replica account 740 (FIG. 7B) in the same distributed database network (e.g., region and/or provider) as the client account 700 (e.g., region 1, as in FIG. 7A).

In some example embodiments, to initiate the virtual cloud data clean room, a clean room cross-reference table 742A shown in FIG. 7C (e.g., clean room 510) is generated based on the provider data set 746 (FIG. 7C), as discussed above with reference to FIGS. 4-6. The clean room cross-reference table 742A comprises a provider account link ID, which is privately hashed using a provider account private salt, and then commonly hashed using the common salt (a salt previously agreed to by client account 700 and provider account 760, as a cross reference key), which creates a common link between the two data sets: a provider data set 746 (FIG. 7C) and requester data set 702 of FIG. 7A (e.g., a client dataset). Further, the secure function 744A of FIG. 7C (e.g., secure function 506) is replicated to the provider replica account 740 as secure function 744B, and then shared to the client account 700 for use by the client as a secure function 744C (e.g., a secure shared function).

With reference to FIG. 7A, the client account 700 initiates a stored procedure 704 to generate the client's portion of the clean room cross-reference table 742C (e.g., clean room cross reference table 514). In calling the secure function 744C, the stored procedure 704 passes into the secure function 744C the agreed-upon ID (e.g., ID for users to cross reference in the table, such as email addresses of the users in the respective client and provider datasets). The secure function 744C looks up the identifier (e.g., a given email) using the hashing function and the common salt to determine whether a given identifier exists in the provider's clean room cross-reference table 742A (FIG. 7C). If the looked-up identifier has a match in the provider data, the secure function 744C (which is a shared function, as discussed above) provides the provider's identifier (e.g., the email in privately salted form by the private salt of the provider) for inclusion in the clean room cross-reference table 742C (FIG. 7A) of the client account 700. Alternatively, if the looked-up identifier does not have a match in the provider data, a dummy value is returned, as discussed above with reference to FIGS. 4-6. For example, the secure function 744C receives the identifier that is passed in by the call (of the stored procedure 704) but then hashes it with a different private salt (random value) to create a dummy value for inclusion in the clean room cross-reference table 742C (FIG. 7A), in accordance with some example embodiments.

Once the cross-reference table matching has been completed, the client account 700 may generate one or more query requests to query data that is in the data clean room shared between the client and provider. In contrast to the approaches of FIGS. 4-6, not all of the provider data set 746 is used in the clean room, as the data set may be too large for replication (to the provider replica data account 740), or replication may be impractical or too costly. To address the issue, the client account 700 in a clean room shared 708A (FIG. 7A) includes a my data table 710A which includes only the data (e.g., columns) that are related to a given query requested by the client account 700. Further, the my secure query requests table 712A in the clean room shared 708A stores the actual queries for tracking and processing. The clean room shared 708A is shared to the provider replica account 740 as clean room share 708B, which includes the my data table 710B and my secure query requests table 712B as share objects (via metadata pointing based access control within the first cloud of client account 700 and provider replica account 740, e.g., in region 1).

In some example embodiments, shared tables are not allowed to be replicated within the environment of the networked-based database system 102 to limit access to shared data and increase security and privacy. To this end, the provider replica account 740 implements a clean room requests database 745A that includes streams and tasks to stream the data of the clean room share 708B and generate new tables (e.g., interim table(s)), including a my secure query requests table 748A and my data table 750A within the provider replica account 740.

Further, the my secure query requests table 748A and my data table 750A are no longer shares, such that the tables are then replicated to the clean room 745B (FIG. 7C) as my data table 750B and my secure query requests table 748B on the provider account 760. In some example embodiments, the streams and tasks in the clean room requests database 745 call stored procedure load request 749 when a new request arrives in my secure query requests table 712B, which is used to determine whether the my data table 750A needs to be re-created to keep the data up to date (e.g., check whether there is new client data). In some example embodiments, if the stored procedure in the clean room request database 745A determines that the data is up to date, then the new my data table 750A does not need to be recreated and the table that was generated previously that is stored on the provider account 760 (previously stored table 750B) is utilized to reduce computation and unnecessary replication of data. Alternatively, if the stored procedure load request 749 determines that the data is not up to date, then the stored procedure will regenerate the my data table 750A, which is then replicated over to provider account 760. In both cases, the table my secure query requests 748A is replicated to initiate the request on account 760.

To perform query processing, the provider account 760 then initiates a task 771 that calls the stored procedure 772 to complete the client queries using the clean room cross-reference table 742A and generate the results table 780A. The results table 780A is then replicated to the provider replica account 740 as a results table 780B and then shared to the client account 700 as the results table 780C. In some example embodiments, for each query in the my secure query requests table 748B that is to be processed, a task 785 is initiated by the provider account 760 to determine whether the my data table 750B needs to be refreshed with new client data. That is, for example, the tasks 777 (FIG. 7B) is called to determine whether there is new data for the tables when the client is sending the my data table and queries to the provider (e.g., task 777 can refresh the replica account databases, including the results tables 780B and cross reference table 742B, from the provider account 760); whereas the tasks 785 is called when the queries are run (by the provider account 760) to determine whether the provider account 760 should first update its dataset before processing the queries.

Although the illustrated examples of FIGS. 7A-7C discuss implementing a clean room across different regions (region 1 and region 2), the architecture of FIG. 7A-7C can also be implemented for the same region across different cloud providers. For example, the client account 700 and the provider replica account 740 can be Microsoft Azure clouds in the same region (region 1), whereas the provider account 760 can be from a different provider, such as an Amazon AWS cloud that is in same region (region 1). Additionally, the architecture of FIG. 7A-7C can also be implemented for combinations of different regions and cloud providers. For example, the client account 700 and provider replica account 740 can be Microsoft Azure clouds in region 1; whereas the provider account 760 can be from a different cloud provider, such as an Amazon AWS cloud, and further be located in a different region (region 2). In this way, different user accounts of the network-based database system 102 can efficiently and securely implement the data clean room across different cloud provider networks and different regions.

Figure 8:
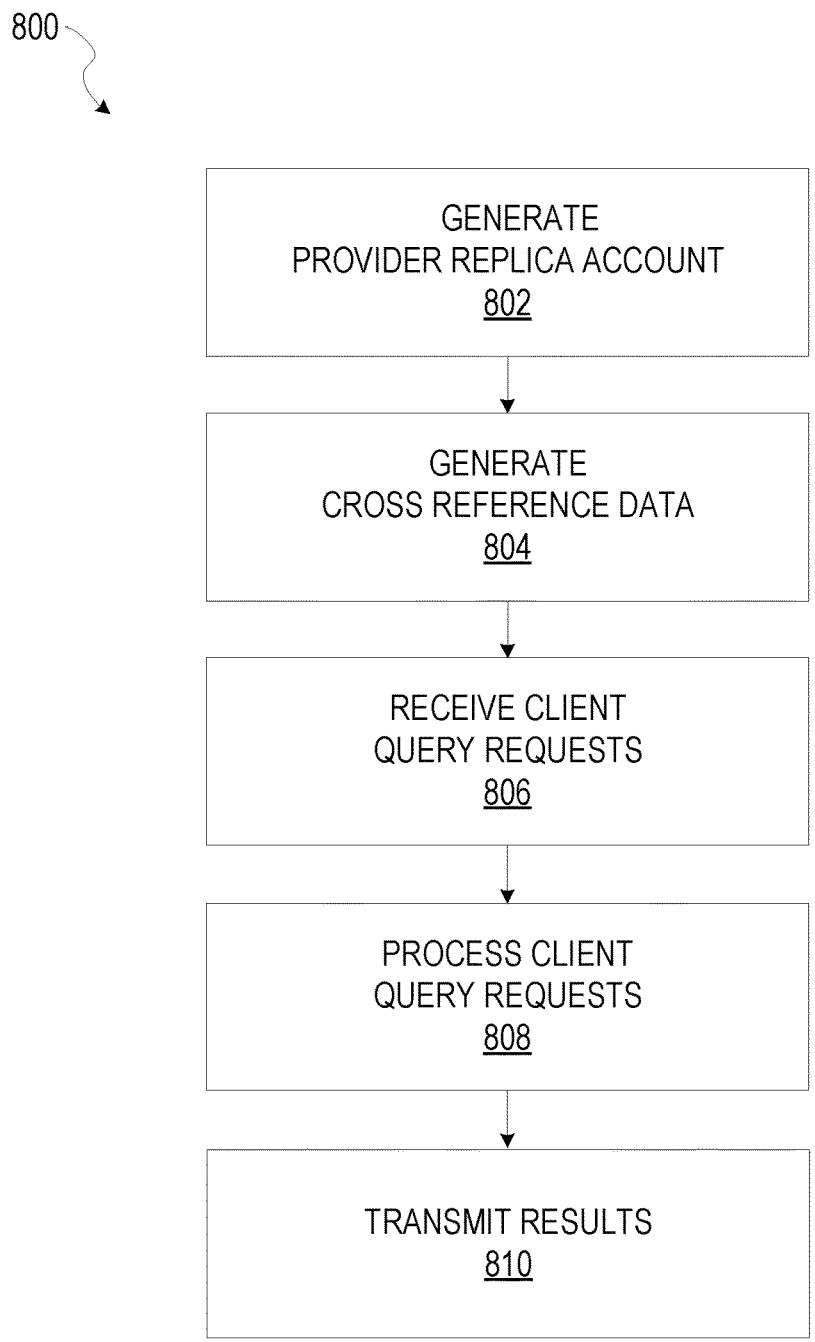
FIG. 8 shows a flow diagram of a method for implementing the clean room across different clouds and regions, according to some example embodiments.

FIG. 8 shows a flow diagram of a method 800 for implementing a data clean room on different regions and clouds, according to some example embodiments. At operation 802, the provider account 760 generates a provider replica account 740. At operation 804, the cross-reference tables are generated and shared across the accounts (e.g., clean room cross-reference tables 742A-C). At operation 806, one or more client query requests are received with client data to be processed in the queries (e.g., my data table 710A, my secure query requests table 712A). At operation 808, the provider replica account 740 and provider account 760 process the client query requests to generate the results table 780A (e.g., via generating and replication of the my secure query requests table 748A and the my data table 750A as discussed above). At operation 810, the results data is transmitted from the provider account 760 to the client account 700 (e.g., via replication and sharing using the provider replica account 740).

Figure 9:
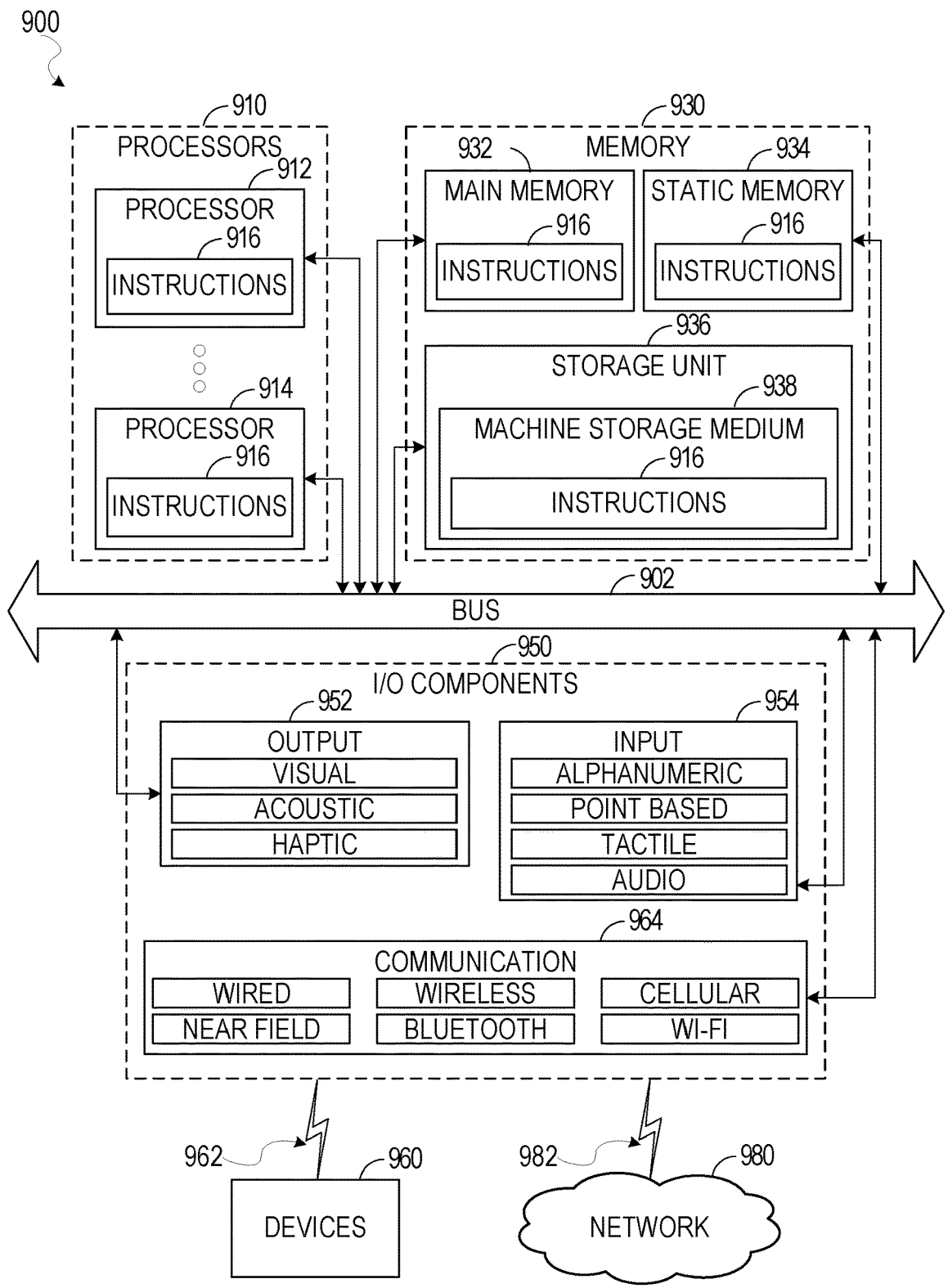
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implemented portions of the data flows described herein. In this way, the instructions 916 transform a general, non-programmed machine into a particular machine 900 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 comprising a machine storage medium 938 may store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 via a coupler 982 or to devices 960 via a coupling 962. For example, the communication components 964 may include a network interface component or another suitable device to interface with the network 980. In further examples, the communication components 964 may include wired communication components, wireless communication components, cellular communication components, and other communication components to provide communication via other modalities. The devices 960 may be another machine or any of a wide variety of peripheral devices (e.g., a peripheral device coupled via a universal serial bus (USB)). For example, as noted above, the machine 900 may correspond to any one of the remote computing device 106, the access management system 110, the compute service manager 112, the execution platform 114, the access management system 118, the Web proxy 120, and the devices 960 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 962 (e.g., a peer-to-peer coupling) to the devices 960. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: generating, in a first virtual cloud of a distributed database, a provider replica database account that is a version of a provider database account in a second virtual cloud of the distributed database, the provider database account generated in the first virtual cloud based on the first virtual cloud comprising a client database account; generating a cross reference table that anonymously cross references client data from a client dataset and provider data from a provider dataset, the client dataset being managed by the client database account on the first virtual cloud, the provider dataset being managed by the provider database account on the second virtual cloud; receiving a query request from the client database account; generating, by the client database account, an interim table by executing a first portion of the query request using the cross reference table and the client dataset; transmitting, via the provider replica database account in the first virtual cloud, the interim table from the client database account in the first virtual cloud to the provider database account in the second virtual cloud; receiving, by the client database account, a results dataset generated by the provider database account according to the query request, the results dataset generated using the interim table and the cross reference table to query data from the provider dataset to include in the results dataset, the results dataset being received by the client database account from the provider replica database account in the first virtual cloud.

Example 2. The method of example 1, wherein the interim table is shared from the client database account to the provider replica database account in the first virtual cloud, and then replicated from the provider replica database account to the provider database account in the second virtual cloud Example 3. The method of any of examples 1 or 2, wherein the result dataset is replicated from the provider database account in the second virtual cloud to the provider replica database account in the first virtual cloud and then shared from the provider replica database account to the client database account.

Example 4. The method of any of examples 1-3, wherein the interim tables are regenerated on the provider replica database account, the regenerated interim tables are replicated to the provider database account.

Example 5. The method of any of examples 1-4, wherein the provider replica database account is a replica of the provider database account.

Example 6. The method of any of examples 1-5, wherein the provider replica database account is not an exact replica and does not comprise a complete version of the provider dataset.

Example 7. The method of any of examples 1-6, wherein the cross reference table cross references client end-users in the client dataset and provider end-users in the provider dataset.

Example 8. The method of any of examples 1-7, wherein the client end-users and the provider-end user are cross referenced in the cross reference table using a shared end-user identifier as a cross reference key.

Example 9. The method of any of examples 1-8, wherein the cross reference table anonymizes end-user identifiers without indicating whether each client end-user corresponds to a provider end-user.

Example 10. The method of any of examples 1-9, wherein at least one client end-user identifier is correlated, in the cross reference table, with a dummy value based on the provider dataset not having a provider end-user identifier that matches the at least one client end-user identifier.

Example 11. The method of any of examples 1-10, wherein at least one provider end-user identifier is correlated, in the cross reference table, with a dummy value based on the client dataset not having a client end-user identifier that matches the at least one provider end-user identifier.

Example 12. The method of any of examples 1-11, wherein the first virtual cloud and the second virtual cloud are in different geographic regions.

Example 13. The method of any of examples 1-12, wherein the first virtual cloud and the second virtual cloud are virtual clouds of different private virtual cloud platforms.

Example 14. The method of any of examples 1-13, wherein the first virtual cloud and the second virtual cloud are in different geographic regions, and wherein the first virtual cloud is a first private virtual cloud platform and the second virtual cloud is a second virtual private cloud platform.

Example 15. A system comprising: one or more processors of a machine; and a memory storing instructions that, when executed by the one or more processors, cause the machine to perform operations implementing any one of example methods 1 to 14.

Example 16. A machine-readable storage device embodying instructions that, when executed by a machine, cause the machine to perform operations implementing any one of example methods 1 to 14.

What is claimed is:

1. A method comprising:
generating, in a first networked database platform, a replica database of a provider database that is in a second networked database platform, the provider database storing a cross reference table that cross references a client dataset of a client database that is in the first networked database platform and a provider dataset of the provider database;
receiving, by the replica database in the first networked database platform, a table that is generated by the client database using the cross reference table;
transmitting, by the replica database, the table to the provider database in the second networked database platform;
receiving, by the replica database, a results dataset that is generated by the provider database by applying a database statement to the provider database using the table generated by the client database; and
sharing, by the replica database, the results dataset with the client database in the first networked database platform.

2. The method of claim 1, wherein a distributed database that comprises the first networked database platform and the second networked database platform, and wherein the replica database and the provider database are managed by a first account of the distributed database and the client database is managed by a second account of the distributed database.

3. The method of claim 1, wherein the table is shared from the client database to the replica database in the first networked database platform, and then replicated from the replica database in the first networked database platform to the provider database in the second networked database platform.

4. The method of claim 1, wherein the results dataset is replicated from the provider database in the second networked database platform to the replica database in the first networked database platform and then shared from the replica database to the client database.

5. The method of claim 1, wherein the table is regenerated on the replica database and replicated from the replica database to the provider database.

6. The method of claim 1, wherein the replica database is a replica of the provider database.

7. The method of claim 1, wherein the replica database is not an exact replica of the provider database and does not comprise a complete version of the provider dataset.

8. The method of claim 1, wherein the cross reference table cross references client end-users in the client dataset and provider end-users in the provider dataset.

9. The method of claim 8, wherein the client end-users and the provider end-users are cross referenced in the cross reference table using a shared identifier as a cross reference key.

10. The method of claim 1, wherein the cross reference table anonymizes end-user identifiers without indicating whether each client end-user corresponds to a provider end-user.

11. The method of claim 1, wherein at least one client end-user identifier is correlated, in the cross reference table, with a dummy value based on the provider dataset not having a provider end-user identifier that matches the at least one client end-user identifier.

12. The method of claim 1, wherein at least one provider end-user identifier is correlated, in the cross reference table, with a dummy value based on the client dataset not having a client end-user identifier that matches the at least one provider end-user identifier.

13. The method of claim 1, wherein the first networked database platform and the second networked database platform are in different geographic regions.

14. The method of claim 1, wherein the first networked database platform and the second networked database platform are virtual clouds of different private virtual cloud platforms.

15. The method of claim 1, wherein the first networked database platform and the second networked database platform are in different geographic regions, and wherein the first networked database platform is a first private virtual cloud platform and the second networked database platform is a second virtual private cloud platform.

16. A system comprising: one or more hardware processors of a machine; and a physical memory storing instructions that, when executed by the one or more hardware processors, cause the machine to perform operations comprising:
   generating, in a first networked database platform, a replica database of a provider database that is in a second networked database platform, the provider database storing a cross reference table that cross references a client dataset of a client database that is in the first networked database platform and a provider dataset of the provider database;
   receiving, by the replica database in the first networked database platform, a table that is generated by the client database using the cross reference table;
   transmitting, by the replica database, the table to the provider database in the second networked database platform;
   receiving, by the replica database, a results dataset that is generated by the provider database by applying a database statement to the provider database using the table generated by the client database; and
   sharing, by the replica database, the results dataset with the client database in the first networked database platform.

17. The system of claim 16, wherein a distributed database that comprises the first networked database platform and the second networked database platform, and wherein the replica database and the provider database are managed by a first account of the distributed database and the client database is managed by a second account of the distributed database.

18. The system of claim 16, wherein the table is shared from the client database to the replica database in the first networked database platform, and then replicated from the replica database in the first networked database platform to the provider database in the second networked database platform.

19. A non-transitory machine-readable storage medium comprising instructions that, when executed by a machine, cause the machine to perform operations comprising:
   generating, in a first networked database platform, a replica database of a provider database that is in a second networked database platform, the provider database storing a cross reference table that cross references a client dataset of a client database that is in the first networked database platform and a provider dataset of the provider database;
   receiving, by the replica database in the first networked database platform, a table that is generated by the client database using the cross reference table;
   transmitting, by the replica database, the table to the provider database in the second networked database platform;
   receiving, by the replica database, a results dataset that is generated by the provider database by applying a database statement to the provider database using the table generated by the client database; and
   sharing, by the replica database, the results dataset with the client database in the first networked database platform.

20. The non-transitory machine-readable storage medium of claim 19, wherein a distributed database that comprises the first networked database platform and the second networked database platform, and wherein the replica database and the provider database are managed by a first account of the distributed database and the client database is managed by a second account of the distributed database.

* * * * *